US008493375B2

(12) United States Patent
Bae

(10) Patent No.: US 8,493,375 B2
(45) Date of Patent: Jul. 23, 2013

(54) DRIVING APPARATUS OF DISPLAY DEVICE

(75) Inventor: Young-Min Bae, Yongin (KR)

(73) Assignee: Samsung Display Co., Ltd., Yongin-si (KR)

(*) Notice: Subject to any disclaimer, the term of this patent is extended or adjusted under 35 U.S.C. 154(b) by 893 days.

(21) Appl. No.: 12/636,369

(22) Filed: Dec. 11, 2009

(65) Prior Publication Data

US 2011/0025665 A1 Feb. 3, 2011

(30) Foreign Application Priority Data

Aug. 3, 2009 (KR) ........................ 10-2009-0071442

(51) Int. Cl.
*G06F 3/038* (2006.01)

(52) U.S. Cl.
USPC .............................. 345/211; 345/212; 345/95

(58) Field of Classification Search
USPC ............... 345/87, 89, 204, 207, 211, 212, 95, 345/102
See application file for complete search history.

(56) References Cited

U.S. PATENT DOCUMENTS 7,403,181 B2 * 7/2008 Moon ............................ 345/87
7,932,889 B2 * 4/2011 Park ............................. 345/102
8,125,433 B2 * 2/2012 Song et al. ...................... 345/95
2005/0174320 A1 * 8/2005 Park ............................. 345/102
2007/0035533 A1 * 2/2007 Kim ............................. 345/204
2010/0033413 A1 * 2/2010 Song et al. ...................... 345/89
2010/0073339 A1 * 3/2010 Lee et al. ...................... 345/207
2010/0097365 A1 * 4/2010 Fang et al. .................... 345/212

FOREIGN PATENT DOCUMENTS

KR 1020060128141 A 12/2006
KR 100734311 B1 6/2007
KR 1020080041524 A 5/2008
KR 1020080056905 A 6/2008

* cited by examiner

*Primary Examiner* — Thuy Pardo
(74) *Attorney, Agent, or Firm* — Christie, Parker & Hale, LLP

(57) ABSTRACT

A driving apparatus for a display device includes: a reference gamma voltage generator configured to generate a reference gamma voltage according to an MTP control signal, a write control signal, and an erase control signal; and a data driver configured to convert a data signal into a data voltage corresponding to the reference gamma voltage. The reference gamma voltage generator includes: a protection unit configured to output a first voltage as a first internal voltage when the MTP control signal is at a first level, and to interrupt the output of the first voltage when the MTP control signal is at a second level; an MTP cell configured to program a bit signal by utilizing the first internal voltage and a second internal voltage according to the write control signal and erase control signal; and a gamma register configured to determine the reference gamma voltage corresponding to the bit signal.

22 Claims, 5 Drawing Sheets

DRIVING APPARATUS OF DISPLAY DEVICE

CROSS-REFERENCE TO RELATED APPLICATIONS

This application claims priority to and the benefit of Korean Patent Application No. 10-2009-0071442 filed in the Korean Intellectual Property Office on Aug. 3, 2009, the entire contents of which are incorporated herein by reference.

BACKGROUND

1. Field

The following description relates generally to a driving apparatus of a display device and, more particularly, to a driving apparatus of an organic light emitting diode (OLED) display.

2. Description of the Related Art

A display device is a device in which a plurality of pixels are disposed in a matrix form to form a display panel, where scan lines and data lines are connected to the pixels, and data signals are selectively applied to the pixels to display images. The display device may be a passive matrix type of light emitting display device or an active matrix type of light emitting display device, according to how the pixels are driven. In terms of resolution, contrast, and operation speed, the active matrix type of light emitting display device, in which unit pixels are selectively lighted, is becoming more widely used.

Such display devices are used as monitors for devices such as personal computers, mobile phones, and mobile information terminals, such as personal digital assistants (PDAs) and various information devices. Liquid crystal displays (LCDs) using a liquid crystal panel, organic light emitting diode (OLED) displays, plasma display panels (PDPs) using a plasma panel, and the like, are examples of display devices. Recently, various light emitting display devices that are relatively light and small, when compared with cathode ray tubes (CRTs), are being developed, and in particular, the organic light emitting diode (OLED) display is receiving much attention, as it has good luminance efficiency, brightness, wide viewing angles, and fast response times.

One factor that is used for improving display quality of the OLED display is its gamma setting. Gamma setting refers to a correlation between display luminance and gray scale data, which is defined according to a gamma curve. In order for the OLED display to have or retain a stable display quality, a very accurate gamma setting is required. In the actual OLED display, a gamma setting error occurs occasionally due to various factors such as a standard deviation between components, a cell gap of a liquid crystal panel, a change in the thickness of color filters, a driving voltage, and various other factors. The error occurrence in the gamma setting causes a deviation between an actual display luminance and a display luminance according to gray scale data. Thus, in order to minimize or reduce such deviation, multi-time programming (MTP) is performed to program a reference gamma voltage in real time. The reference gamma voltage is a voltage inputted to a driving circuit that generates a data signal for determining a display luminance. The driving circuit generates a data signal by using the reference gamma voltage according to the gray scale data, and a light emitting element emits light according to the data signal. Thus, if the reference gamma voltage changes, the display luminance of the OLED display also changes. In this case, however, if a surge voltage, noise, or the like, is inputted to an MTP cell performing MTP, the programmed reference gamma voltage is altered or varied.

The above information disclosed in this Background section is only for enhancement of understanding of the background of the described technology and therefore it may contain information that does not form the prior art that is already known in this country to a person of ordinary skill in the art.

SUMMARY OF THE INVENTION

Exemplary embodiments of the present invention provide a driving apparatus of a display device for preventing or reducing occurrence of a programmed reference gamma voltage from changing due to a surge voltage or noise.

An exemplary embodiment provides a driving apparatus for a display device, including: a reference gamma voltage generator configured to generate a reference gamma voltage according to an MTP control signal, a write control signal, and an erase control signal; and a data driver configured to convert a data signal into a data voltage corresponding to the reference gamma voltage and to apply the converted data voltage to a display panel. The reference gamma voltage generator includes: a protection unit configured to output a first voltage as a first internal voltage when the MTP control signal is at a first level and to interrupt the output of the first voltage when the MTP control signal is at a second level; an MTP cell configured to program a bit signal by utilizing the first internal voltage and a second internal voltage according to the write control signal and the erase control signal; and a gamma register configured to determine the reference gamma voltage corresponding to the bit signal.

The MTP control signal may be at the first level when the bit signal is to be programmed, and may be at the second level when the MTP cell is to be in a standby state. The protection unit may include: a delay unit configured to delay transmission of the first voltage; a first switch configured to transmit an output from the delay unit as the first internal voltage; and a second switch configured to turn the first switch on or off according to the MTP control signal. The delay unit may include: a resistor between a terminal for applying the first voltage and a source terminal of the first switch; and a capacitor between the source terminal of the first switch and ground. The protection unit may further include a resistor between a terminal for applying the first voltage and a gate terminal of the first switch. A source terminal of the second switch may be connected to the gate terminal of the first switch, a drain terminal of the second switch may be grounded, and a gate terminal of the second switch may receive the MTP control signal. The MTP cell may include: a first driver configured to output the first internal voltage or the second internal voltage according to the write control signal; a second driver configured to output the first internal voltage or the second internal voltage according to the erase control signal; and a sensing output unit configured to receive the outputs from the first and second drivers and to output the bit signal according to the received outputs.

Therefore, according to exemplary embodiments of the present invention, a programmed reference gamma voltage can be prevented from changing due to a surge voltage or noise.

DETAILED DESCRIPTION

Figure 1:
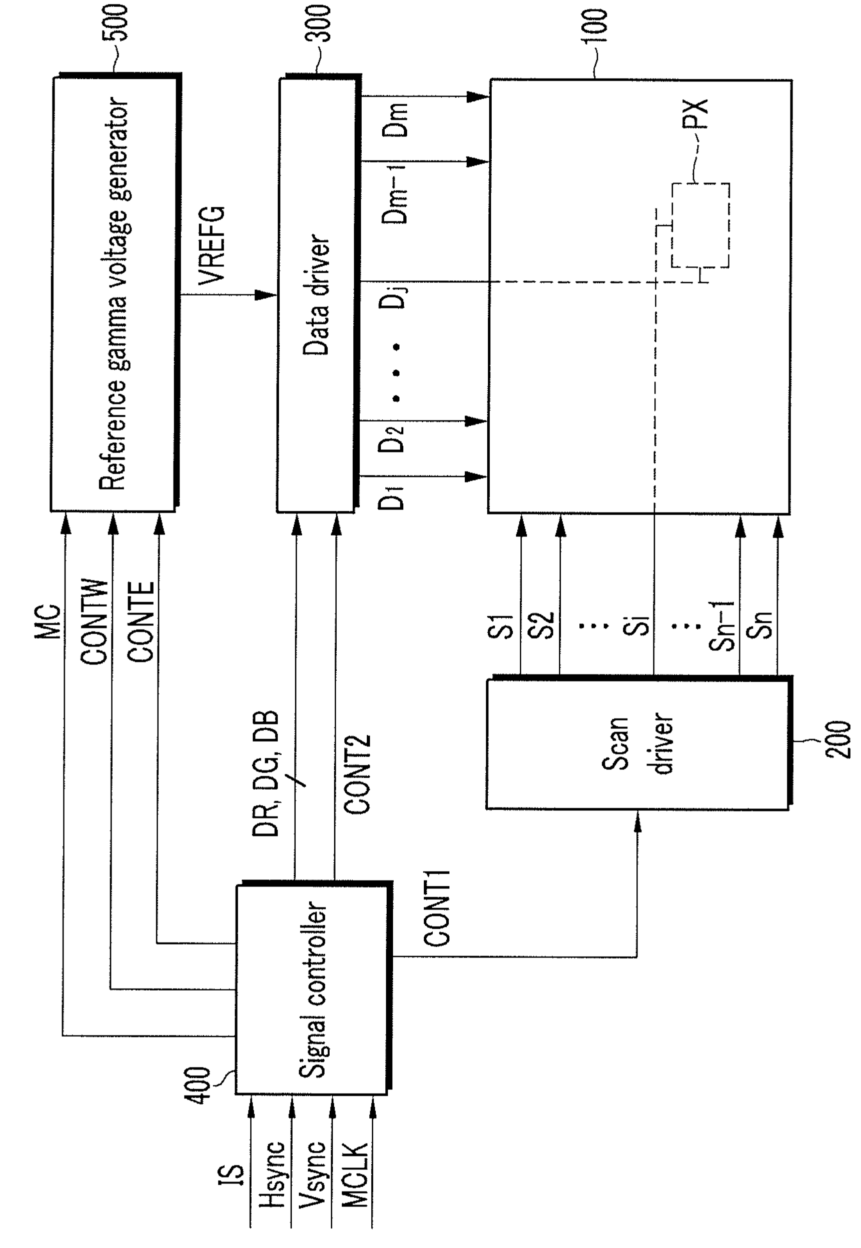
FIG. 1 is a schematic block diagram of a display device including a driving apparatus according to an exemplary embodiment.

In the following detailed description, certain exemplary embodiments have been shown and described by way of illustration. As those skilled in the art will recognize, the described embodiments may be modified in various different ways without departing from the spirit or scope of the embodiments. Accordingly, the drawings and description are to be regarded as illustrative in nature and not restrictive. Like reference numerals designate like elements throughout the specification.

Throughout this specification and the claims that follow, when an element is "coupled" to another element, the element may be "directly coupled" to the other element or "electrically coupled" to the other element through one or more additional elements. In addition, unless explicitly described to the contrary, the word "comprise" and variations such as "comprises" or "comprising" will be understood to imply the inclusion of stated elements, but not the exclusion of any other elements.

Figure 2:
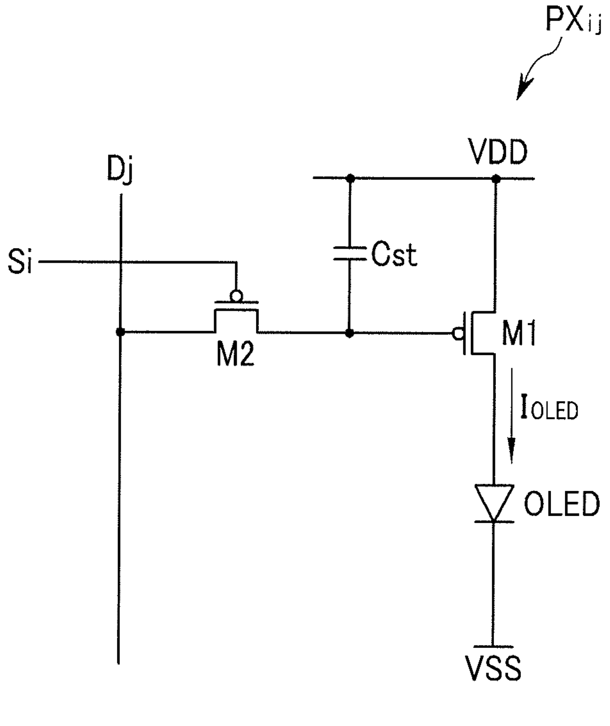
FIG. 2 is an equivalent circuit diagram of a pixel (PX) illustrated in FIG. 1.

FIG. 1 is a schematic block diagram of a display device including a driving apparatus according to an exemplary embodiment, and FIG. 2 is an equivalent circuit diagram of a pixel (PX) illustrated in FIG. 1.

With reference to FIG. 1, the display device according to an exemplary embodiment includes a display panel 100, a scan driver 200, a data driver 300, a signal controller 400, and a reference gamma voltage generator 500. The display panel 100 includes a plurality of signal lines S1~Sn and D1~Dm, and a plurality of pixels (PX) connected with the plurality of signal lines S1~Sn and D1~Dm and arranged substantially in a matrix form. The signal lines S1~Sn and D1~Dm include a plurality of scan lines S1~Sn for transferring scan signals, and a plurality of data lines D1~Dm for transferring data voltages. The scan lines S1~Sn extend substantially in a row direction and are substantially parallel to each other, and the data lines D1~Dm extend substantially in a column direction and are substantially parallel to each other.

With reference to FIG. 2, each pixel (PX), for example, a pixel PXij connected to an i-th (i=1, 2, . . . , n) scan line Si and a j-th (j=1, 2, . . . , m) data line Dj includes an organic light emitting diode (OLED), a driving transistor M1, a capacitor Cst, and a switching transistor M2. In some embodiments, the pixel PXij may also include a light emission control transistor M3 (not shown), and/or various additional components.

The driving transistor M1 has a control terminal, an input terminal, and an output terminal. The control terminal of the driving transistor M1 is connected to the switching transistor M2, the input terminal of the driving transistor M1 is connected to a driving voltage VDD, and the output terminal of the driving transistor M1 is connected to the OLED. The driving transistor M1 outputs a current ($I_{OLED}$) having a magnitude that varies depending on the voltage difference between the control terminal and the output terminal of the driving transistor M1.

The switching transistor M2 has a control terminal, an input terminal, and an output terminal. The control terminal of the switching transistor M2 is connected to the scan line Si, the input terminal of the switching transistor M2 is connected to the data line Dj, and the output terminal of the switching transistor M2 is connected to the control terminal of the driving transistor M1. The switching transistor M2 transfers a data signal, i.e., a data voltage, applied to the data line Dj to the driving transistor M1 in response to a scan signal applied to the scan line Si.

The capacitor Cst is connected between the control terminal and the input terminal of the driving transistor M1. The capacitor Cst charges a voltage corresponding to the data voltage applied to the control terminal of the driving transistor M1 and maintains the voltage after the switching transistor M2 is turned off.

The OLED includes an anode connected with the output terminal of the driving transistor M1 and a cathode connected with a common voltage VSS. The OLED emits light with an intensity that varies according to the current $I_{OLED}$ supplied from the driving transistor M1, thus displaying an image.

The OLED may emit light of a color from among the primary colors. The primary colors may be the three primary colors of red, green, and blue, and a desired color may be displayed by a spatial sum or a temporal sum of these three primary colors. Some OLEDs may emit white light, for increasing luminance. Alternatively, OLEDs of all the pixels PX may emit white light, and some pixels (PX) may include a color filter (not shown) to alter white light emitted from the OLEDs to display light of one of the primary colors.

In the embodiment of FIG. 2, the driving transistor M1 and the switching transistor M2 are p-channel field effect transistors (FETs). In this case, the respective control terminals, input terminals, and the output terminals of the driving transistor M1 and the switching transistor M2 respectively correspond to gates, sources, and drains. Alternatively, at least one of the switching transistor M2 or the driving transistor M1 may, for example, be an n-channel FET. The connection relationship of the transistors M1 and M2, the capacitor Cst, and the OLED may correspondingly be modified. The pixel PXij illustrated in FIG. 2 is one example of a pixel of a display device, but pixels including at least two transistors or at least one capacitor but having different configurations may also be used.

With reference back to FIG. 1, the scan driver 200 is connected with the scan lines S1~Sn of the display panel 100, and sequentially applies scan signals to the scan lines S1~Sn according to a scan control signal CONT1. The scan signals include a gate-on voltage Von that turns on the switching transistors M2 and a gate-off voltage Voff that turns off the switching transistors M2. When the switching transistors M2 are p-channel FETs, the gate-on voltage Von and the gate-off voltage Voff are a low voltage and a high voltage, respectively.

The data driver 300 is connected with the data lines D1~Dm of the display panel 100 and is controlled according to a data control signal CONT2. The data driver 300 generates data signals according to video data signals DR, DG, and DB from the signal controller 400 and a reference gamma voltage VREFG from reference gamma voltage generator 500, and applies the generated data signals to the data lines D1~Dm. Each of the data signals may be a voltage signal (hereinafter referred to as a "data voltage") or a current signal (hereinafter referred to as a "data current") according to the pixel type.

Upon receiving an input signal IS, a horizontal synchronization signal Hsync, a vertical synchronization signal Vsync, and a main clock signal MCLK, the signal controller 400 generates the video data signals DR, DG, and DB, the scan control signal CONT1, the data control signal CONT2, an MTP control signal MC, a write control signal CONTW, and an erase control signal CONTE. The scan control signal CONT1 may include a scan start signal STV indicating starting of scanning, and at least one clock signal for controlling an output period of the gate-on voltage Von. The scan control signal CONT1 may further include an output enable signal OE for limiting a duration of the gate-on voltage Von. The data control signal CONT2 may include a horizontal synchronization start signal SCH indicating starting of a transmission of the video data signals DR, DG, and DB with respect to one row of pixels PX, and a load signal LOAD indicating application of data voltages to the data lines D1~Dm. The MTP control signal MC, the write control signal CONTW, and the erase control signal CONTE are signals for adjusting the reference gamma voltage VREFG, which will be described later. The reference gamma voltage generator 500 generates the reference gamma voltage VREFG according to the MTP control signal MC, the write control signal CONTW, and the erase control signal CONTE. The reference gamma voltage generator 500 will be described in detail with reference to FIG. 3.

Figure 3:
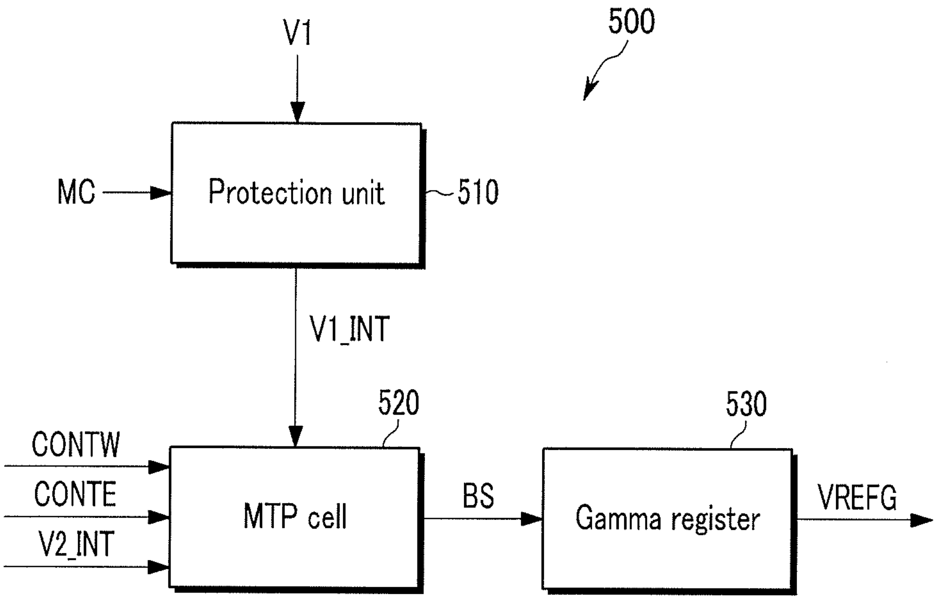
FIG. 3 is a schematic block diagram of a reference gamma voltage generator 500 illustrated in FIG. 1.
Figure 4:
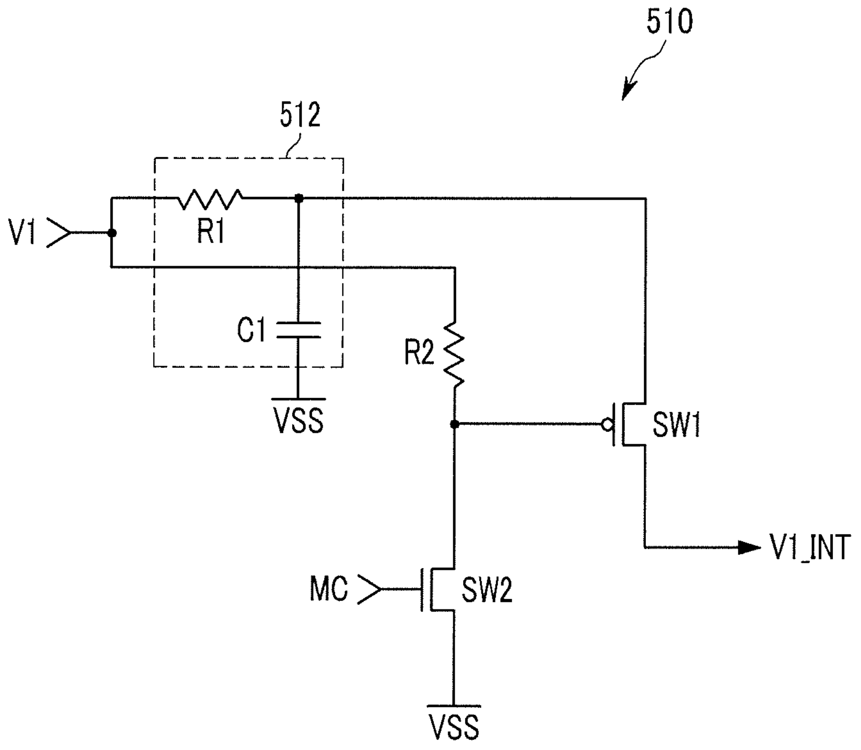
FIG. 4 is a circuit diagram of a protection unit 510 illustrated in FIG. 3.
Figure 5:
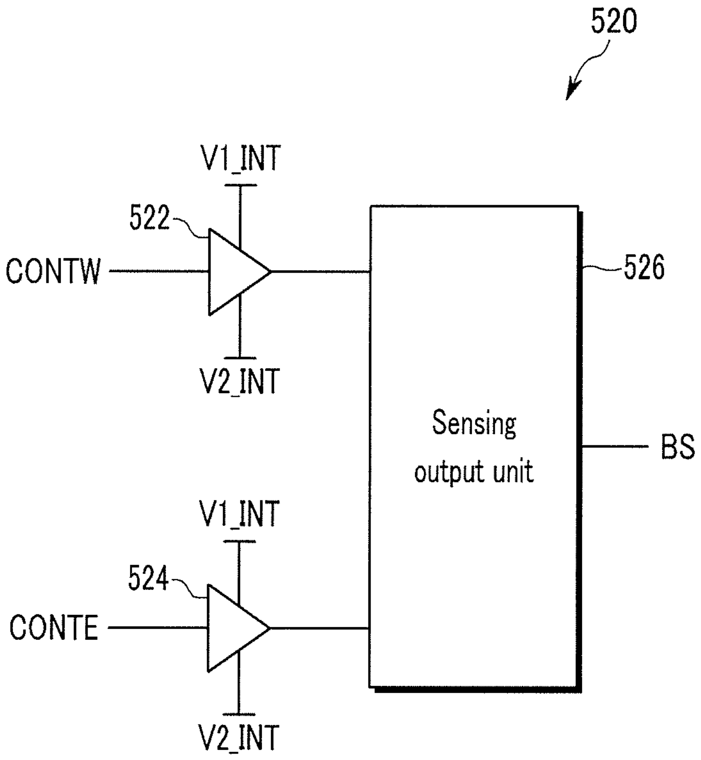
FIG. 5 is a circuit diagram of a multi-time programming (MTP) cell 520 illustrated in FIG. 3.

FIG. 3 is a schematic block diagram of the reference gamma voltage generator 500 illustrated in FIG. 1, FIG. 4 is a circuit diagram of a protection unit 510 illustrated in FIG. 3, and FIG. 5 is a circuit diagram of a multi-time programming (MTP) cell 520 illustrated in FIG. 3.

With reference to FIG. 3, the reference gamma voltage generator 500 includes the protection unit 510, the MTP cell 520, and a gamma register 530. When the MTP control signal MC is of a first level, the protection unit 510 generates, or outputs, a first voltage V1 as a first internal voltage V1_INT. When the MTP control signal MC is of a second level, the protection unit 510 interrupts (i.e., cuts off or blocks) the first voltage V1 from being output. Here, the first level refers to a signal level for programming a bit setting signal BS in the MTP cell 520, and which may be a high voltage level (e.g., a power voltage level) in the present exemplary embodiment. The second level is a signal level for the MTP cell to be in a standby state, where programming is not performed, and in the present exemplary embodiment, the second level may be a low voltage level (e.g., a ground voltage level). In the embodiment, the first voltage V1 has a higher level than the high voltage level.

As shown in FIG. 4, the protection unit 510 includes a delay unit 512, a second resistor R2, and first and second switches SW1 and SW2. The delay unit 512 includes a first resistor R1 and a first capacitor C1. One end of the first resistor R1 is connected with an input terminal of the first voltage V1, and the other end of the first resistor R1 is connected with a source terminal of the first switch SW1. One end of the first capacitor C1 is connected with the other end of the first resistor R1, and the other end of the first capacitor C1 is grounded.

One end of the second resistor R2 is connected with the input terminal of the first voltage V1, and the other end of the second resistor R2 is connected with a gate terminal of the first switch SW1. A drain terminal of the first switch SW1 is connected with an output terminal for the first internal voltage V1_INT. A source terminal of the second switch SW2 is connected with the gate terminal of the first switch SW1, and a drain terminal of the second switch SW2 is grounded. The MTP control signal MC is inputted to a gate terminal of the second switch SW2. In FIG. 4, the first switch SW1 is configured as a p-channel metal oxide semiconductor field effect transistor (PMOSFET), and the second switch SW2 is configured as an n-channel metal oxide semiconductor field effect transistor (NMOSFET). However, the embodiment is not limited thereto, for example, the first switch SW1 may be configured as an NMOSFET and the second switch SW2 may be configured as a PMOSFET. The protection unit 510 delays the time for the first voltage V1 to be transferred to the source terminal of the first switch SW1, compared to the time for the first voltage V1 to be transferred to the gate terminal of the first switch SW1, due to the delay unit 512. Accordingly, even when a surge voltage or noise component is introduced to the application terminal of the first voltage V1 in a standby state, the first switch SW1 is maintained in a turned-off state. Accordingly, introduction of a surge voltage to the output terminal for the first internal voltage V1_INT can be prevented or minimized, thereby preventing or reducing occurrence of the programmed reference gamma voltage from changing in response any such surge voltage.

With reference to FIG. 3, the MTP cell 520 sets the bit signal BS by utilizing the first internal voltage V1_INT and the second internal voltage V2_INT according to the write control signal CONTW and the erase control signal CONTE. The write control signal CONTW is generated to program the bit signal BS, and the erase control signal CONTE is generated to erase the programmed bit signal BS. In FIG. 3, a single MTP cell 520 is illustrated, but in other embodiments, a plurality of MTP cells 520 may be configured according to a bit number of the bit signal BS. Namely, when the bit signal BS is a 2-bit signal, there may be two MTP cells 520, whereas when the bit signal BS is a 3-bit signal, there may be three MTP cells 520. As shown in FIG. 5, the MTP cell 520 includes a first driver 522, a second driver 524, and a sensing output unit 526. The first driver 522 drives one of the first or second internal voltages V1_INT or V2_INT according to the write control signal CONTW, and outputs the same. The second driver 524 also drives one of the first or second internal voltages V1_INT or V2_INT according to the erase control signal CONTE, and outputs the same. The sensing output unit 526 senses outputs from the first and second drivers 522 and 524 and correspondingly outputs a bit signal BS. Upon receiving the bit signal BS, the gamma register 530 modifies a gamma reference voltage VREFG corresponding to the received bit signal BS, and outputs the modified gamma reference voltage VREFG, for example, to the data driver 300 illustrated in FIG. 1.

While this disclosure has been described in connection with what is presently considered to be practical exemplary embodiments, it is to be understood that the invention is not limited to the disclosed embodiments, but is instead intended to cover various modifications and equivalent arrangements included within the spirit and scope of the appended claims.

What is claimed is:

1. A driving apparatus for a display device, comprising:

a reference gamma voltage generator configured to generate a reference gamma voltage according to a multi-time programming (MTP) control signal, a write control signal, and an erase control signal; and a data driver configured to convert a data signal into a data voltage corresponding to the reference gamma voltage and to apply the converted data voltage to a display panel, wherein the reference gamma voltage generator comprises:

a protection unit configured to output a first voltage as a first internal voltage when the MTP control signal is at a first level, and to interrupt the output of the first voltage when the MTP control signal is at a second level;

an MTP cell configured to program a bit signal by utilizing the first internal voltage and a second internal voltage according to the write control signal and the erase control signal, wherein the MTP control signal is at the first level when the bit signal is to be programmed, and is at the second level when the MTP cell is to be in a standby state; and a gamma register configured to determine the reference gamma voltage corresponding to the bit signal.

2. The driving apparatus of claim 1, wherein the first level is a high voltage level and the second level is a low voltage level.

3. The driving apparatus of claim 2, wherein the first voltage is higher than the high voltage level.

4. The driving apparatus of claim 1, wherein the protection unit comprises:

a delay unit configured to delay transmission of the first voltage;

a first switch configured to transmit an output from the delay unit as the first internal voltage; and a second switch configured to turn the first switch on or off according to the MTP control signal.

5. The driving apparatus of claim 4, wherein the delay unit comprises:

a resistor between a terminal for applying the first voltage and a source terminal of the first switch; and a capacitor between the source terminal of the first switch and ground.

6. The driving apparatus of claim 4, wherein the protection unit further comprises a resistor between a terminal for applying the first voltage and a gate terminal of the first switch.

7. The driving apparatus of claim 6, wherein a source terminal of the second switch is connected to the gate terminal of the first switch, a drain terminal of the second switch is grounded, and a gate terminal of the second switch receives the MTP control signal.

8. The driving apparatus of claim 4, wherein the first switch comprises a p-channel transistor, and the second switch comprises an n-channel transistor.

9. The driving apparatus of claim 1, wherein the MTP cell comprises:

a first driver configured to output the first internal voltage or the second internal voltage according to the write control signal;

a second driver configured to output the first internal voltage or the second internal voltage according to the erase control signal; and a sensing output unit configured to receive the outputs from the first and second drivers and to output the bit signal according to the received outputs.

10. The driving apparatus of claim 1, wherein the reference gamma voltage generator further comprises at least one additional MTP cell.

11. The driving apparatus of claim 10, wherein a number of MTP cells comprised in the reference gamma voltage generator corresponds to a number of bits in the bit signal.

12. A driving apparatus for a display device, comprising:

a reference gamma voltage generator configured to generate a reference gamma voltage according to a multi-time programming (MTP) control signal, a write control signal, and an erase control signal; and a data driver configured to convert a data signal into a data voltage corresponding to the reference gamma voltage and to apply the converted data voltage to a display panel, wherein the reference gamma voltage generator comprises:

a protection unit configured to output a first voltage as a first internal voltage when the MTP control signal is at a first level, and to interrupt the output of the first voltage when the MTP control signal is at a second level;

an MTP cell configured to program a bit signal by utilizing the first internal voltage and a second internal voltage according to the write control signal and the erase control signal; and a gamma register configured to determine the reference gamma voltage corresponding to the bit signal;

wherein the protection unit comprises:

a delay unit configured to delay transmission of the first voltage;

a first switch configured to transmit an output from the delay unit as the first internal voltage; and a second switch configured to turn the first switch on or off according to the MTP control signal.

13. The driving apparatus of claim 12, wherein the MTP control signal is at the first level when the bit signal is to be programmed, and is at the second level when the MTP cell is to be in a standby state.

14. The driving apparatus of claim 13, wherein the first level is a high voltage level and the second level is a low voltage level.

15. The driving apparatus of claim 14, wherein the first voltage is higher than the high voltage level.

16. The driving apparatus of claim 12, wherein the delay unit comprises:

a resistor between a terminal for applying the first voltage and a source terminal of the first switch; and a capacitor between the source terminal of the first switch and ground.

17. The driving apparatus of claim 12, wherein the protection unit further comprises a resistor between a terminal for applying the first voltage and a gate terminal of the first switch.

18. The driving apparatus of claim 17, wherein a source terminal of the second switch is connected to the gate terminal of the first switch, a drain terminal of the second switch is grounded, and a gate terminal of the second switch receives the MTP control signal.

19. The driving apparatus of claim 12, wherein the first switch comprises a p-channel transistor, and the second switch comprises an n-channel transistor.

20. The driving apparatus of claim 12, wherein the MTP cell comprises:

a first driver configured to output the first internal voltage or the second internal voltage according to the write control signal;

a second driver configured to output the first internal voltage or the second internal voltage according to the erase control signal; and a sensing output unit configured to receive the outputs from the first and second drivers and to output the bit signal according to the received outputs.

21. The driving apparatus of claim 12, wherein the reference gamma voltage generator further comprises at least one additional MTP cell.

22. The driving apparatus of claim 21, wherein a number of MTP cells comprised in the reference gamma voltage generator corresponds to a number of bits in the bit signal.

* * * * *